United States Patent
Tomla et al.

(10) Patent No.: US 10,513,451 B2
(45) Date of Patent: Dec. 24, 2019

(54) TREATMENT OF MATURE FINE TAILINGS IN PRODUCED WATER BY FLOCCULATION AND DEWATERING

(71) Applicant: BAKER HUGHES, A GE COMPANY, LLC, Houston, TX (US)

(72) Inventors: Christabel T. Tomla, Katy, TX (US); Oleksandr V. Kuznetsov, Houston, TX (US); Radhika Suresh, Sugar Land, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 28 days.

(21) Appl. No.: 15/934,764

(22) Filed: Mar. 23, 2018

(65) Prior Publication Data

US 2018/0273405 A1    Sep. 27, 2018

Related U.S. Application Data

(60) Provisional application No. 62/475,659, filed on Mar. 23, 2017.

(51) Int. Cl.
| | |
|---|---|
| *C02F 1/56* | (2006.01) |
| *C02F 11/147* | (2019.01) |
| *C10G 1/04* | (2006.01) |
| *B01D 21/01* | (2006.01) |
| *E21B 21/06* | (2006.01) |
| *C02F 1/00* | (2006.01) |
| *C02F 101/10* | (2006.01) |
| *C02F 103/10* | (2006.01) |
| *B03D 3/06* | (2006.01) |

(52) U.S. Cl.
CPC ............ *C02F 1/56* (2013.01); *B01D 21/01* (2013.01); *C02F 11/147* (2019.01); *C10G 1/04* (2013.01); *E21B 21/068* (2013.01); *B03D 3/06* (2013.01); *C02F 1/00* (2013.01); *C02F 2101/10* (2013.01); *C02F 2103/10* (2013.01)

(58) Field of Classification Search
None
See application file for complete search history.

(56) References Cited

U.S. PATENT DOCUMENTS

| | | | |
|---|---|---|---|
| 4,536,294 A | 8/1985 | Gullet et al. | |
| 6,872,779 B2 * | 3/2005 | Mori | B01D 21/01 524/555 |
| 2012/0175315 A1 * | 7/2012 | Revington | B01F 5/0463 210/732 |

(Continued)

FOREIGN PATENT DOCUMENTS

| | | |
|---|---|---|
| WO | 2001005712 A1 | 1/2001 |
| WO | 2014111884 A1 | 7/2014 |

OTHER PUBLICATIONS

Erciyes et al. (Die Angewandte Makronnoleckular Chemie, 1992, 200, 163-171).*

*Primary Examiner* — Clare M Perrin
(74) *Attorney, Agent, or Firm* — Greenberg Traurig LLP

(57) ABSTRACT

A process for drying mature fine tailings is provided. A low molecular weight anionic organic polymer is contacted with a tailings stream to flocculate mature fine tailings and enhance dewatering. The tailings stream can contain, for example, water, sand, silt and fines clays produced from a bitumen extraction process for oil sands ore. The process can also involve rigidification of the suspension.

5 Claims, 1 Drawing Sheet

(56) References Cited

U.S. PATENT DOCUMENTS

| | | |
|---|---|---|
| 2013/0206702 A1 | 8/2013 | Lin et al. |
| 2014/0116925 A1 | 5/2014 | Bara et al. |
| 2014/0224733 A1* | 8/2014 | Osness .................... C02F 1/281 210/638 |
| 2015/0027929 A1* | 1/2015 | Watson .................. C10G 1/045 208/390 |
| 2015/0057196 A1 | 2/2015 | Debord et al. |
| 2016/0326443 A1* | 11/2016 | Young .................. B01D 17/047 |

\* cited by examiner

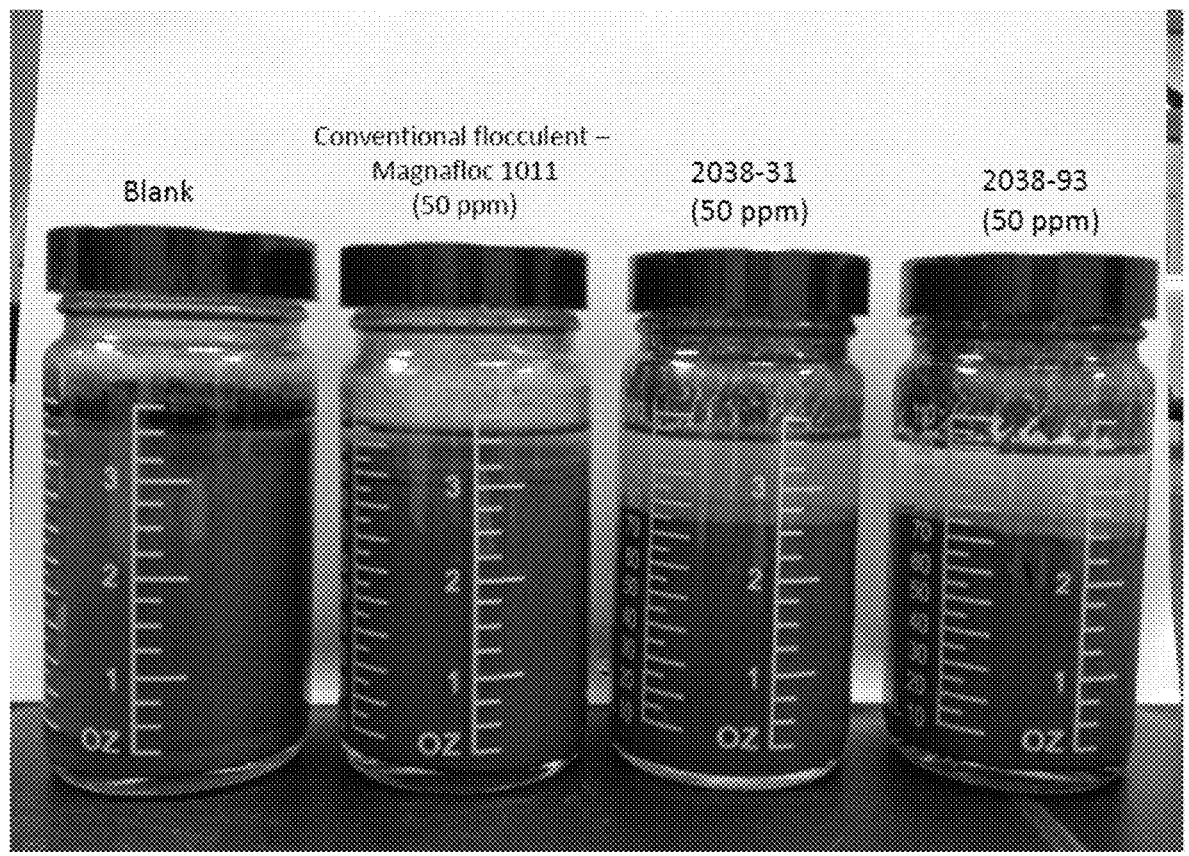

TREATMENT OF MATURE FINE TAILINGS IN PRODUCED WATER BY FLOCCULATION AND DEWATERING

RELATED APPLICATIONS

This application claims the benefit, and priority benefit, of U.S. Provisional Patent Application Ser. No. 62/475,659, filed Mar. 23, 2017, the disclosure and contents of which are incorporated by reference herein in their entirety.

FIELD OF THE INVENTION

The presently disclosed subject matter relates to flocculation and dewatering of mature fine tailings in produced water from oil sands mining.

BACKGROUND

Large quantities of water are produced during oil and gas operations. One particular type of produced water is waste water from oil sands mining operations for bitumen production. This waste water can contain a high percentage of suspended solids known as oil sand tailings. These tailings can consist of water, sand, silt and clays which can become mature fine tailings (MFT) over time.

Oil sands tailings now occupy an inordinately large area in relation to total mining distribution. This results in large inventories of MFT requiring long term storage within fluid containment. Additionally, tailings lakes are toxic and prone to leaking. The growing volume of MFT waste represents a significant environmental liability that continues to grow proportional to increases in bitumen production. Prompt, effective measures are needed to stop the growth of MFT and remove the accumulated waste from the landscape.

Chemical aids such as polymer flocculents and coagulants have been widely employed in order to promote separation of suspended solids in tailing lakes. Commercial polymers such as polyacrylamide are high molecular weight polymers which can cause significant increases in viscosity even at low dosages. As a result, fines settling rates can be negatively impacted. Thus, improvements in this field of technology are desired.

BRIEF DESCRIPTION OF THE DRAWINGS

FIG. 1 is an illustration of the effect of various polymer flocculents on settling rate of tailings in illustrative embodiments of the presently disclosed subject matter.

While certain preferred illustrative embodiments will be described herein, it will be understood that this description is not intended to limit the subject matter to those embodiments. On the contrary, it is intended to cover all alternatives, modifications, and equivalents, as may be included within the spirit and scope of the subject matter as defined by the appended claims.

SUMMARY

In certain illustrative embodiments, a method of separating mature fine tailings from a suspension comprising mature fine tailings and water is provided, wherein the method comprises introducing a polymer flocculent into the suspension such that the polymer flocculent interacts with the mature fine tailings, the polymer flocculent comprising an anionic organic polymer with a molecular weight in the range from 30,000-50,000 daltons. The anionic organic polymer can include acrylic acid grafted onto a triblock copolymer consisting of a central hydrophobic block of polypropylene glycol flanked by two hydrophilic blocks of polyethylene glycol. The anionic organic polymer can include acrylic acid and acrylamide grafted onto a triblock copolymer consisting of a central hydrophobic block of polypropylene glycol flanked by two hydrophilic blocks of polyethylene glycol.

In certain illustrative embodiments, a method of separating solid materials from a suspension of produced water comprising solid materials and water from an oil and gas well is provided, wherein the method comprises dispersing a polymer flocculent into the suspension such that the polymer flocculent interacts with the solid materials, the polymer flocculent comprising an anionic organic polymer with a molecular weight in the range from 30,000-50,000 daltons. The anionic organic polymer can include acrylic acid grafted onto a triblock copolymer consisting of a central hydrophobic block of polypropylene glycol flanked by two hydrophilic blocks of polyethylene glycol. The anionic organic polymer can include acrylic acid and acrylamide grafted onto a triblock copolymer consisting of a central hydrophobic block of polypropylene glycol flanked by two hydrophilic blocks of polyethylene glycol.

DETAILED DESCRIPTION

The presently disclosed subject matter generally relates to the field of treating oil sands mature fine tailings. In certain illustrative embodiments, a process for drying mature fine tailings is provided which comprises contacting a low molecular weight anionic organic polymer with a tailings stream to flocculate mature fine tailings and enhance dewatering. The tailings stream can contain, for example, water, sand, silt and fines clays produced from a bitumen extraction process for oil sands ore. In certain illustrative embodiments the process can also involve rigidification of the suspension.

As used herein, the term "produced water" means water that is produced as a byproduct along with oil and gas from an oil and gas operation, including but not limited to tailings water. In general, it has been found that certain polymer flocculents can increase the settling rate of solids in produced water.

In certain illustrative embodiments, a method of separating solid materials from a suspension of produced water comprising solid materials and water from an oil and gas well is provided, wherein a polymer flocculent is introduced into the suspension.

In other illustrative embodiments, a method of separating mature fine tailings from a suspension comprising mature fine tailings and water is also provided, wherein a polymer flocculent is introduced into the suspension.

In certain illustrative embodiments, the polymer flocculent can be acrylic acid that is grafted onto a Pluronic™ polymer to form a copolymer. In other illustrative embodiments, the polymer flocculent can be a combination of acrylic acid and acrylamide which are grafted onto a Pluronic™ polymer to form a copolymer. In certain illustrative embodiments, the copolymer formed will have the formula PEO-PPO-PEO-PAA or PAA-PEO-PPO-PEO-PAM.

In certain illustrative embodiments, the Pluronic™ polymer can be Pluronic™ F-127. Pluronic™ F-127 (available from BASF) has a molecular formula of $HO.(C_2H_4O)_m.(C_3H_6O)_n.H$ and is a hydrophilic non-ionic surfactant of the more general class of copolymers known as poloxamers. Pluronic™ F-127 is a triblock copolymer consisting of a central hydrophobic block of polypropylene glycol flanked by two hydrophilic blocks of polyethylene glycol. The approximate lengths of the two PEG blocks are 101 repeat units while the approximate length of the propylene gycol block is 56 repeat units. This particular compound is also known by the name Poloxamer™ 407 (available from Aldrich) or by the trade name Synperonic™ PE/F 127 (available from Croda).

The benefits of utilizing Pluronic™ F-127 in connection with the presently disclosed subject matter are that it is very easily disperse in water compare to the other polymers. The solubility of the copolymer is very important as well as the rate of dispersion. Pluronic™ F-127 can easily be obtained from different vendors compare to the other polymers. The heat triggered gelling behavior of the F-127 copolymer was one important factor when choosing Pluronic™ for use in the presently disclosed subject matter.

Water treatment with the polymer flocculents described herein has been found to be especially beneficial for removal of mature fine tailings from produced water generated in oil sands operations such as bitumen extraction processes.

In certain illustrative embodiments, the synthesized polymer flocculents described herein have low to medium molecular weight (specifically, 30,000-50,000 daltons compare to the hydrolyzed PAM with a molecular weight of approximately 15 millions daltons) and do not change viscosity at ambient temperature. Preliminary tests demonstrate that these polymer flocculents produce improved settling rates when compared to commercial flocculants.

In certain illustrative embodiments, the process for drying the mature fine tailings can involve rigidification of the suspension. Rigidification refers to a formation of networked structure of particulate solids. Rigidification is a process that produces chemically bonded tailings which occupy smaller volume and, therefore smaller land area and results in more water released when compared to settling or sedimentation. Rigidification is achieved by introducing water soluble polymer into the suspension of particulates. The treatment enables the material to retain fluidity as being pumped, but upon standing causes the material to rigidify.

To facilitate a better understanding of the presently disclosed subject matter, the following examples of certain aspects of certain embodiments are given. In no way should the following examples be read to limit, or define, the scope of the presently disclosed subject matter.

EXAMPLES

Formulation of Polymers
Polymer #2038-31.
Acrylic acid was grafted unto a Pluronic™ polymer to form a copolymer. Acrylic acid was partially neutralized by changing the pH of the solution from pH=2.2-2.7 to pH=3.1-3.4. This was achieved by slowly adding a small amount of 50% sodium hydroxide (2-3 ml) while checking the pH.

Dodecane (200 ml) was added to a 3 neck round bottom flask (250 ml) containing Ganex V216 (2 g). The mixture was deoxygenated for 2 hours while stirring by bubbling nitrogen into the reaction mixture.

Pluronic™ F127 polymer (17.5 g) was added to a round bottom flask containing partially neutralized acrylic acid (20 g) and the mixture was deoxygenated. When the polyol was dissolved, dilauroyl peroxide (100 mg) and 2,2'-azobis(2-methyl propionitrile) (50 mg) were added to the mixture and deoxygenated by bubbling nitrogen into the flask. The combined reactants were deoxygenated while stirring.

The mixture containing Ganex and dodecane was transferred into the reaction mixture and stirred while deoxygenating with nitrogen for 30 mins. The mixture was then heated to 70 degrees C. and kept at this temperature for 6 hours. The resulting mixture was then cooled down. The precipitate was filtered and washed with hexane followed by heptane, then it was dried under vacuum for 24 hrs at 40 degrees C.

Polymer #2038-93.
Acrylic acid and acrylamide were grafted unto a Pluronic™ polymer to form a copolymer. Acrylic acid was partially neutralized by changing the pH of the solution from pH=2.2-2.7 to pH=3.1-3.4. This was achieved by slowly adding a small amount of 50% sodium hydroxide (2-3 ml) while checking the pH. If partial neutralization (at least 6 mol %) was not achieved, the final product was not able to dissolve completely in water.

Acrylamide (5.0 g) was added to the partially neutralized acrylic acid (20 g) and the mixture was deoxygenated.

Dodecane (200 ml) was added to a 3 neck round bottom flask (250 ml) containing Ganex V216 (2 g). The mixture was deoxygenated for 2 hours while stirring by bubbling nitrogen into the reaction mixture.

Pluronic™ F127 polymer (17.5 g) was added to a round bottom flask containing a mixture of partially neutralized acrylic acid (20 g) and acrylamide and the mixture was deoxygenated. When the polyol was completely dissolved, dilauroyl peroxide (100 mg) and 2, 2'-azobis (2-methyl propionitrile (50 mg) were added to the mixture and deoxygenated by bubbling nitrogen into the flask. The combined reactants were deoxygenated while stirring.

The mixture containing Ganex and dodecane was transferred into the reaction mixture and stirred and deoxygenated with nitrogen for 30 mins. The mixture was then heated to 70 degrees C. and kept at this temperature for 6 hours.

It is important to note that the reaction is very exothermic so the temperature increase should be done gradually and in a controlled environment if possible. The resulting mixture was then cooled down. The precipitate was filtered and washed with hexane followed by heptane, then it was dried under vacuum for 24 hrs at 40 degrees C.

Testing of Polymers
50 ppm of the polymers was added into diluted tailings. The tailings contained ~40% solids. For testing purposes, the tailings were diluted twice (final solids content ~20%). The 2038-31 and 2038-93 polymers each had good solubility and performed much better than the commercial flocculent (Magnafloc 1011). The results can be seen in FIG. 1 hereto.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter.

Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the appended claims.

What is claimed is:
1. A method of separating mature fine tailings from a suspension comprising mature fine tailings and water, the method comprising: introducing a polymer flocculent into the suspension such that the polymer flocculent interacts with the mature fine tailings, the polymer flocculent comprising an anionic organic polymer with a molecular weight in the range from 30,000-50,000 daltons.

2. The method of claim 1, wherein the anionic organic polymer comprises acrylic acid grafted onto a triblock copolymer consisting of a central hydrophobic block of polypropylene glycol flanked by two hydrophilic blocks of polyethylene glycol.

3. The method of claim 1, wherein the anionic organic polymer comprises acrylic acid and acrylamide grafted onto a triblock copolymer consisting of a central hydrophobic block of polypropylene glycol flanked by two hydrophilic blocks of polyethylene glycol.

4. A method of separating solid materials from a suspension of produced water comprising solid materials and water from an oil and gas well, the method comprising: dispersing a polymer flocculent into the suspension such that the polymer flocculent interacts with the solid materials, the polymer flocculent comprising an anionic organic polymer with a molecular weight in the range from 30,000-50,000 daltons, wherein the anionic organic polymer comprises acrylic acid grafted onto a triblock copolymer consisting of a central hydrophobic block of polypropylene glycol flanked by two hydrophilic blocks of polyethylene glycol.

5. A method of separating solid materials from a suspension of produced water comprising solid materials and water from an oil and gas well, the method comprising: dispersing a polymer flocculent into the suspension such that the polymer flocculent interacts with the solid materials, the polymer flocculent comprising an anionic organic polymer with a molecular weight in the range from 30,000-50,000 daltons wherein the anionic organic polymer comprises acrylic acid and acrylamide grafted onto a triblock copolymer consisting of a central hydrophobic block of polypropylene glycol flanked by two hydrophilic blocks of polyethylene glycol.

* * * * *